(12) United States Patent
Goeltenboth et al.

(10) Patent No.: US 9,002,576 B2
(45) Date of Patent: Apr. 7, 2015

(54) CONTROL DEVICE AND METHOD FOR OPERATING A MOTOR VEHICLE

(71) Applicant: Dr. Ing. h.c. F. Porsche Aktiengesellschaft, Stuttgart (DE)

(72) Inventors: Juergen Goeltenboth, Oehringen (DE); Michael Klaus, Weissach (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 15 days.

(21) Appl. No.: 13/864,372

(22) Filed: Apr. 17, 2013

(65) Prior Publication Data

US 2013/0289822 A1 Oct. 31, 2013

(30) Foreign Application Priority Data

Apr. 26, 2012 (DE) .......................... 10 2012 103 659

(51) Int. Cl.
*F16F 15/00* (2006.01)
*B60G 17/06* (2006.01)

(52) U.S. Cl.
CPC .............. *F16F 15/002* (2013.01); *B60G 17/06* (2013.01); *B60G 2400/91* (2013.01)

(58) Field of Classification Search
None
See application file for complete search history.

(56) References Cited

U.S. PATENT DOCUMENTS

| 5,409,078 | A | 4/1995 | Ishioka et al. |
| 5,792,948 | A * | 8/1998 | Aoki et al. ................. 73/115.01 |
| 6,865,466 | B2 * | 3/2005 | Voight et al. .................... 701/53 |
| 2005/0228574 | A1 | 10/2005 | Ichikawa et al. |
| 2009/0178892 | A1 * | 7/2009 | Lamers et al. ................ 188/267 |
| 2011/0066292 | A1 * | 3/2011 | Moriya et al. ................ 700/280 |

FOREIGN PATENT DOCUMENTS

| DE | 4123254 | A1 | | 1/1993 |
| DE | 10124513 | A1 | | 11/2002 |
| DE | 102007025735 | A1 | * | 12/2008 |
| GB | 2492965 | A | | 1/2013 |
| JP | 61220926 | A | | 10/1986 |
| JP | 2007253755 | A | | 10/2007 |

* cited by examiner

*Primary Examiner* — Michael J Zanelli
(74) *Attorney, Agent, or Firm* — Leydig, Voit & Mayer, Ltd.

(57) ABSTRACT

A control device of a motor vehicle, which control device receives, from at least one body-side sensor, a vibration actual value of at least one corresponding body-side reference point and receives, from at least one chassis-side sensor, a vibration actual value of at least one corresponding chassis-side reference point, the control device making a decision on the reference point or points for which actuating signals for the actuators of the active assembly bearings are generated, and on which vibration desired value is used, in such a manner that the respective vibration actual value follows the respective vibration desired value.

11 Claims, 1 Drawing Sheet

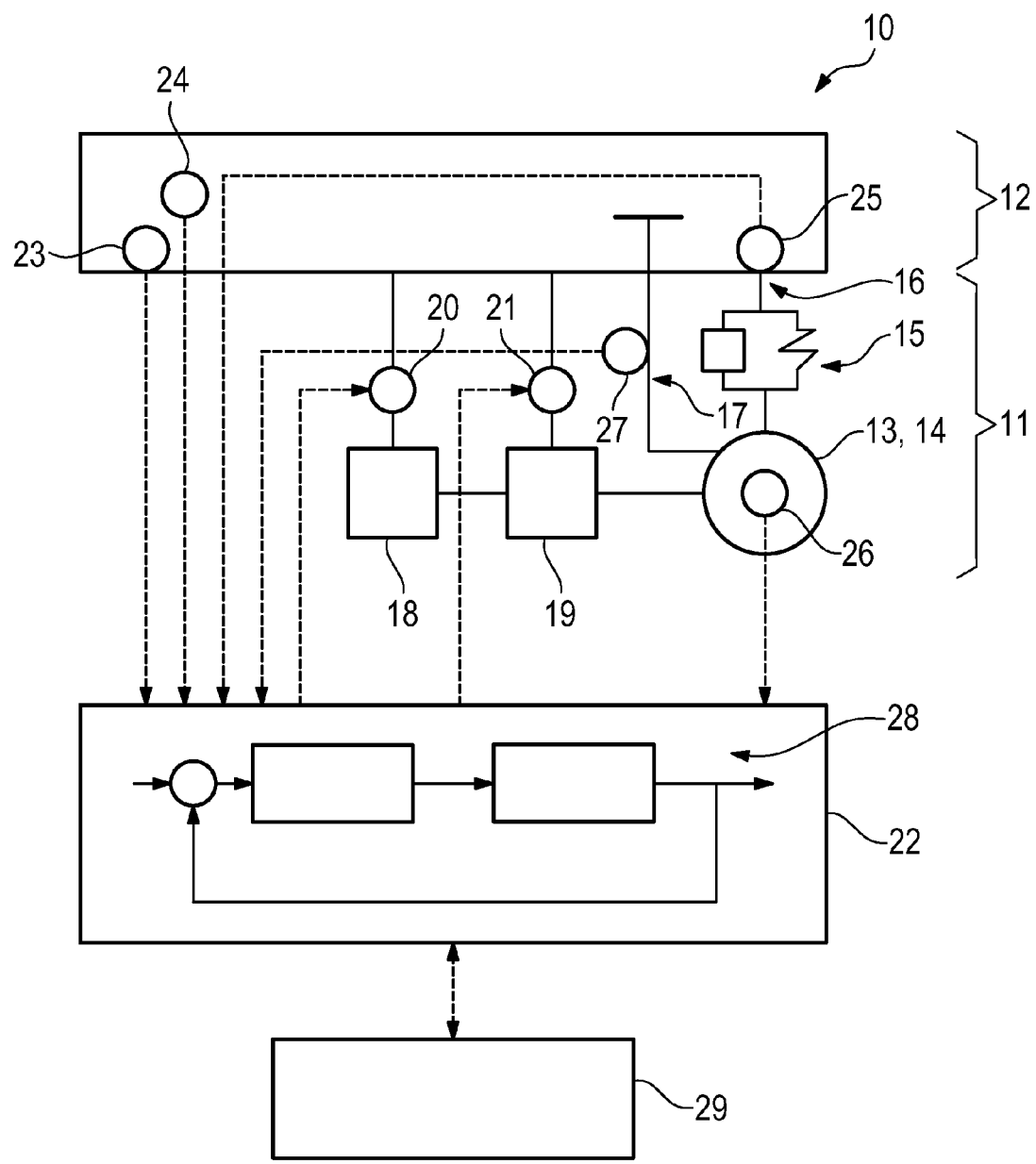

CONTROL DEVICE AND METHOD FOR OPERATING A MOTOR VEHICLE

CROSS REFERENCE TO RELATED APPLICATIONS

This application claims priority to German Patent Application No. DE 10 2012 103 659.4, filed Apr. 26, 2012, which is hereby incorporated by reference herein in its entirety.

FIELD

The invention relates to a control device of a motor vehicle and to a method for operating a motor vehicle.

BACKGROUND

DE 41 23 254 A1 discloses a control device of a motor vehicle, which control device determines manipulated variables for active assembly bearings used to bear a drive assembly of the motor vehicle, namely on the basis of measurement signals from sensors which are accommodated at fastening points of the active assembly bearings on the body or on the drive assembly. In this case, the control device stores a vehicle-specific family of characteristics for the motor vehicle in order to ensure a vehicle-specific optimum degree of comfort for the motor vehicle.

SUMMARY

In an embodiment, the present invention provides a control device of a motor vehicle, the control device being configured to receive actual values of controlled variables from sensors, including, from at least one body-side sensor, a vibration actual value of at least one corresponding body-side reference point and, from at least one chassis-side sensor, a vibration actual value of at least one corresponding chassis-side reference point. The control device generates actuating signals for actuators of active assembly bearings on the basis of a control deviation between the actual values and corresponding desired values in such a manner that the actual values follow the desired values. The control device makes a decision on each reference point for which actuating signals for the actuators of the active assembly bearings are generated, and on which vibration desired value is used, in such a manner that the respective vibration actual value follows the respective vibration desired value.

BRIEF DESCRIPTION OF THE DRAWING

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following:

FIG. 1 shows a diagram of a motor vehicle having a control device of a motor vehicle.

DETAILED DESCRIPTION

In an embodiment, the present invention provides a novel control device of a motor vehicle and a novel method for operating a motor vehicle.

According to the invention, the control device receives, from at least one body-side sensor, a vibration actual value of at least one corresponding body-side reference point and receives, from at least one chassis-side sensor, a vibration actual value of at least one corresponding chassis-side reference point.

The control device makes a decision on the reference point or points for which actuating signals for actuators of active assembly bearings are generated, and on which vibration desired value is used, in such a manner that the respective vibration actual value follows the respective vibration desired value.

This present invention proposes for the first time a control device of a motor vehicle, which control device automatically decides, on the basis of current operating parameters of the motor vehicle, which body-side reference point and/or which chassis-side reference point is/are taken as a basis for using vibration actual values recorded by sensors at the corresponding reference points to generate actuating signals for the actuators of the active assembly bearings on the basis of a comparison of the vibration actual values with corresponding vibration desired values, such that the respective vibration actual value follows the respective vibration desired value. This makes it possible to provide, on the control side, on the basis of current operating parameters of the motor vehicle, a behavior of the motor vehicle optimally matched to the current operating parameters.

The control device preferably makes a decision, on the basis of a selected driving program, on the reference point or points for which actuating signals for the actuators of the active assembly bearings are generated and on which vibration desired value is used. This makes it possible to provide, on the basis of the selected driving program, a behavior of the motor vehicle optimally matched to the respective driving program.

According to one advantageous development of the invention, when a comfort driving program is active, the control device generates the actuating signals for the actuators of the active assembly bearings in such a manner that the vibration actual value at least at the or each body-side reference point approaches a vibration desired value stored for the comfort driving program.

When a sports driving program is active, the control device generates the actuating signals for the actuators of the active assembly bearings in such a manner that the vibration actual value at least at the or each body-side reference point approaches a vibration desired value stored for the sports driving program.

When the comfort driving program is active, vibrations, preferably at the or each body-side reference point, are preferably completely eliminated in order to ensure a particularly comfortable behavior for the motor vehicle. When a sports driving program is active, vibrations, preferably at chassis-side reference points, are adjusted in such a manner that a sporty driving behavior of the motor vehicle is established.

The control device preferably generates actuating signals for actuators of active drive assembly bearings, driving dynamics support systems, torque support systems, pitching support systems and/or actuating signals for actuators of active transmission bearings. The generation of actuating signals for actuators of active drive assembly bearings and/or of actuating signals for actuators of active transmission bearings is particularly preferred.

According to one advantageous development of the invention, when a comfort driving program is active, the control device generates the actuating signals for the actuators of the active assembly bearings in such a manner that the assembly bearings vibrate with such a phase shift with respect to the vibration actual value of the or each reference point that body-side vibrations are minimized/eliminated. Depending on the phase angle, the assembly can therefore be used to increase the impedance or can be used as a vibration absorber for the vibrations excited by the road on the body. The same applies to other driving programs, but with a possibly different phase angle of the actuating signals. A particular level of road excitation on the body may be desirable in the sports program, for example. A behavior of the motor vehicle optimally matched to the respective driving program can be particularly preferably provided by reducing or increasing the body impedance of the motor vehicle on the basis of the selected driving program.

The control device preferably carries out the above control operation for vibrations in a frequency range up to a maximum of 50 Hz, preferably up to a maximum of 40 Hz. When the control device controls the vibrations in this frequency range, negative interactions with higher-frequency vibrations in other frequency ranges can be avoided, for example interactions with vibrations of cylinder switch-off operations.

FIG. 1 shows a highly schematic block diagram of a motor vehicle 10, a chassis 11 and a body 12 of the motor vehicle 10 being schematically shown.

A wheel 13 of an axle 14 of the chassis 11 of the motor vehicle 10 is shown, the wheel 13 shown in FIG. 1 being connected to the body 12 via a spring-damper system 15. The wheel 13 or the axle 14 is connected to the body 12 via the spring-damper system 15 at a so-called dome point 16 of the body 12.

A steering system 17 acts on the axle 14 shown in FIG. 1.

A drive torque which is provided by a drive assembly 18 can act on the driven axle 14, a transmission 19 being connected between the drive assembly 18 and the driven axle 14.

The drive assembly 18 is connected to the body 12 of the motor vehicle 10 via an assembly bearing 20, namely a drive assembly bearing, and the transmission 19 is connected to the body 12 of the motor vehicle 10 via an assembly bearing 21, namely a transmission bearing, the abovementioned assembly bearings 20, 21 being active assembly bearings, the bearing properties of which can be actively adjusted using an actuator of the respective assembly bearing 20 or 21.

FIG. 1 also shows a control device 22 of the motor vehicle 10, the control device 22 being provided with actual values of controlled variables by sensors. FIG. 1 shows a multiplicity of sensors which provide the control device 22 with measured values and therefore actual values of controlled variables. FIG. 1 thus shows, in a highly schematic manner, a plurality of body-side sensors which each provide the control device 22 with a vibration actual value of a corresponding body-side reference point. FIG. 1 thus shows a body-side base plate sensor 23 which provides the control device 22 with a vibration actual value of a body-side base plate of the motor vehicle. FIG. 1 also shows a body-side seat sensor 24 which provides the control device 22 with a vibration actual value of a vehicle seat of the motor vehicle 10. In addition, a dome point sensor 25 which provides the control device 22 with a vibration actual value of the dome point 16 is also shown as a body-side sensor in FIG. 1.

Chassis-side sensors which each provide the control device 22 with a vibration actual value of a chassis-side reference point are also shown in FIG. 1, with FIG. 1 showing a chassis-side axle sensor 26 which provides the control device 22 with a vibration actual value of the vehicle axle 14 or of the wheel 13, and with FIG. 1 also showing a chassis-side steering system sensor 27 which provides the control device 22 with a vibration actual value of the steering system 17 of the motor vehicle 10. It should be noted that positions may vary depending on the vehicle type or requirements.

The control device 22 generates, on the basis of the vibration actual value of at least one of the above reference points, that is to say at least one body-side reference point and/or at least one chassis-side reference point, a manipulated variable or an actuating signal for an actuator of one of the above assembly bearings 20, 21 (also driving dynamics support systems), namely in such a manner that, as a result of the respective assembly bearing 20 or 21 being driven, the vibration actual value of the respective reference point follows a corresponding vibration desired value, this control function of the control device 22 being visualized in a schematic manner in FIG. 1 by means of a control circuit 28.

The control device 22 receives, from at least one body-side sensor 23 and/or 24 and/or 25, a vibration actual value of at least one corresponding body-side reference point and receives, from at least one chassis-side sensor 26 and/or 27, a vibration actual value of at least one corresponding chassis-side reference point, the actual values depicting or reflecting, in particular, vibrations caused by so-called base-point or initial excitation. On the basis of current operating parameters of the motor vehicle, in particular on the basis of a selected driving program, the control device 22 automatically makes a decision on the reference point or points for which actuating signals for the actuators of the active assembly bearings are generated and on which vibration desired value is used, namely in such a manner that the respective vibration actual value of the respective reference point follows the respective vibration desired value. An optimally matched behavior of the motor vehicle can hereby be provided on the control side on the basis of current operating parameters of the motor vehicle.

When a comfort driving program for the motor vehicle has been selected or is active, the control device 22 generates actuating signals for the actuators of the active assembly bearings 20 and/or 21 in such a manner that at least the vibration actual value at the or each body-side reference point approaches a vibration desired value stored for the comfort driving program in the control device 22, the actuating signals also preferably being generated in the comfort driving program in such a manner that the vibration actual value at the or each chassis-side reference point also approaches a vibration desired value stored for the comfort driving program. A particularly comfortable behavior of the motor vehicle 10 can then hereby be ensured in the comfort driving program at the or each body-side reference point and preferably at the or each chassis-side reference point.

When the sports driving program is active or has been selected, the control device 22 generates actuating signals for the actuators of the active assembly bearings 20 and/or 21 in such a manner that the vibration actual value at least at the or each chassis-side reference point approaches a corresponding vibration desired value stored for the sports driving program. In the sports driving program for example, a particular vibration behavior may be desired for an axle-side reference point and/or a steering-system-side reference point of the chassis in order to convey or set a sporty driving behavior in the sports driving program. A vibration actual value is preferably also influenced at at least one body-side reference point in the sports driving program in such a manner that said actual value approaches a vibration desired value stored for the sports driving program.

When the comfort driving program is active or has been selected, the control device 22 generates the actuating signals for the actuators of the active assembly bearings in such a manner that the assembly bearings 20 and/or 21 vibrate with a phase shift with respect to the vibration actual value of the or each reference point, such that body-side vibrations are minimized/eliminated. Depending on the phase angle, the assembly may thus be used to increase the impedance or may be used as a vibration absorber for the vibrations excited by the road on the body. The same applies to other driving programs, but with a possibly different phase angle of the actuating signals. A particular level of road excitation on the body may be desirable in the sports program, for example.

The above-described control or driving of the active assembly bearings 20 and/or 21 is preferably carried out for vibrations at the respective reference points in a frequency range up to as maximum of 50 Hz, preferably up to a maximum of 40 Hz. In this case, negative interactions with vibrations in other frequency ranges, which are caused by a cylinder switch-off operation on the drive assembly 18, for example, can be avoided.

FIG. 1 also shows a control device 29 which interchanges data with the control device 22 according to the invention, the control device 29 being able to be, for example, the control device of an active chassis and/or of a driving safety system. Functionally connecting the control device 29 of the active chassis and/or of the driving safety system to the control device 22 makes it possible to jointly use the potentials of the systems when generating actuating signals or manipulated variables for the actuators of the active assembly bearings 20 and/or 21.

When the control device 29 of a driving safety system detects that the motor vehicle departs from a lane, it is possible, for example, for the control device 22 to generate manipulated variables for the actuators of the active assembly bearings 20 and/or 21 in order to generate a warning message relating to the lane departure (warning against falling asleep) or a change in the distance, for example, by deliberately producing a vibration at one of the reference points of the motor vehicle.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

What is claimed is:

1. A control device of a motor vehicle, the control device being configured to:

receive actual values of controlled variables from sensors, including, from at least one body-side sensor, a vibration actual value of at least one corresponding body-side reference point and, from at least one chassis-side sensor, a vibration actual value of at least one corresponding chassis-side reference point, the actual values including at least one of a vibration actual value of an axle from a chassis-side axle sensor or a vibration actual value of a steering system from a chassis-side steering system sensor;

generate actuating signals for actuators of active assembly bearings on the basis of a control deviation between the actual values and corresponding desired values so as to cause the actual values to follow desired values; and determine each reference point for which actuating signals for the actuators of the active assembly bearings are generated, and determine the respective vibration desired value that is used.

2. The control device as recited in claim 1, wherein the control device is configured to receive at least one of a vibration actual value of a vehicle seat from a body side seat sensor, a vibration actual value of a base plate from a body-side base plate sensor, or a vibration actual value of a dome point from a body-side dome point sensor.

3. The control device as recited in claim 1, wherein the determining of each reference point for which actuating signals for the actuators of the active assembly bearings are generated and the determining of the respective vibration value that is used are based on a selected driving program.

4. The control device as recited in claim 3, wherein, when a comfort driving program is active, the control device is configured to generate the actuating signals for the actuators of the active assembly bearings so as to cause the vibration actual value at each body-side reference point to approach a vibration desired value stored for the comfort driving program.

5. The control device as recited in claim 4, wherein the control device is further configured to generate the actuating signals for the actuators so as to cause the vibration actual value at each chassis-side reference point to approach a vibration desired value stored for the comfort driving program.

6. The control device as recited in claim 3, wherein, when a sports driving program is active, the control device is configured to generate the actuating signals for the actuators of the active assembly bearings so as to cause the vibration actual value at each chassis-side reference point to approach a vibration desired value stored for the sports driving program.

7. The control device as recited in claim 6, wherein the control device is further configured to generate the actuating signals for the actuators so as to cause the vibration actual value at each body-side reference point to approach a vibration desired value stored for the sports driving program.

8. The control device as recited in claim 3, wherein, when a comfort driving program is active, the control device is configured to generate the actuating signals for the actuators of the active assembly bearings so as to cause the assembly bearings to vibrate with such a phase shift with respect to the vibration actual value of each reference point that body-side vibrations are minimized or eliminated.

9. The control device as recited in claim 1, wherein the control device carries out the above control operation for vibrations in a frequency range up to a maximum of 50 Hz.

10. The control device as recited in claim 9, wherein the control device carries out the above control operation for vibrations in a frequency range up to a maximum of 40 Hz.

11. The control device as recited in claim 1, wherein the control device generates actuating signals for actuators of at least one of active drive assembly bearings or active transmission bearings.

* * * * *